United States Patent
Huscroft et al.

(10) Patent No.: US 8,176,498 B2
(45) Date of Patent: May 8, 2012

(54) POWER SETTING ADJUSTMENTS BY MISSION OPERATING SYSTEM IN RESPONSE TO REQUESTS FROM PLATFORM MANAGER

(75) Inventors: Carey Huscroft, Davis, CA (US); Thomas L. Vaden, Neshanic Station, NJ (US); Stephen B. Lyle, Granite Bay, CA (US); Martin A. Goldstein, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1274 days.

(21) Appl. No.: 11/853,134

(22) Filed: Sep. 11, 2007

(65) Prior Publication Data
US 2009/0070789 A1      Mar. 12, 2009

(51) Int. Cl.
*G06F 3/00*     (2006.01)
*G09F 1/00*     (2006.01)

(52) U.S. Cl. ........................................ 719/310; 713/300
(58) Field of Classification Search .................. 719/310; 713/300; 7/300, 320
See application file for complete search history.

(56) References Cited

U.S. PATENT DOCUMENTS

| | | | |
|---|---|---|---|
| 6,480,964 B1* | 11/2002 | Oh | 713/310 |
| 7,080,271 B2* | 7/2006 | Kardach et al. | 713/323 |
| 7,395,421 B1* | 7/2008 | Nowlin | 713/2 |
| 7,529,952 B2* | 5/2009 | Lu | 713/300 |
| 7,533,288 B2* | 5/2009 | Hatasaki et al. | 714/4.4 |
| 7,584,294 B2* | 9/2009 | Plamondon | 709/233 |
| 7,941,812 B2* | 5/2011 | Sekar | 719/319 |
| 2004/0128569 A1 | 7/2004 | Wyatt et al. | |
| 2004/0255171 A1 | 12/2004 | Zimmer et al. | |
| 2005/0268078 A1 | 12/2005 | Zimmer et al. | |
| 2006/0085794 A1* | 4/2006 | Yokoyama | 718/100 |
| 2007/0180284 A1* | 8/2007 | Tsuji | 713/323 |

OTHER PUBLICATIONS

Jaco R. Lorch, Reducing Processor Power Consumption by Improving Processor time management in a Single-user Operating system, 1996.*

* cited by examiner

*Primary Examiner* — Lechi Truong

(57) ABSTRACT

A computer system includes software running on a hardware platform. The hardware platform provides a platform manager having an user interface that is independent of that for a mission operating system running on said platform. The platform manager issues platform requests for power-setting adjustments. The software includes a mission operating system with a power controller incorporated in or running on the mission operating system. The power controller adjusts power settings for hardware devices at least in part as a function of the platform requests.

12 Claims, 2 Drawing Sheets

POWER SETTING ADJUSTMENTS BY MISSION OPERATING SYSTEM IN RESPONSE TO REQUESTS FROM PLATFORM MANAGER

BACKGROUND OF THE INVENTION

Power management for computers began as a way to extend the "between-charges" operating time of a battery-powered (e.g., laptop) computers. More recently, the demand for power by large computer systems has grown to the point that it is a substantial factor in total cost of ownership. Some large computer installations, e.g., data centers, can strain the ability of a power utility company to deliver the power. Accordingly, power management is now used to maintain power consumption within energy-conservation and economic budgets.

Computers manipulate data stored in computer-readable media in accordance with programs of computer-executable instructions, also encoded in computer-readable media. Application programs running on the computer define the mission of a computer. Rather than running on hardware, applications run on a mission operating system that provides an interface between the applications and the hardware-relieving application developers of the need to ensure compatibility with each hardware variant on which the application is to run. The operating system communicates with the hardware through a "hardware abstraction layer" (HAL) or "basic input-output system" (BIOS), which launches automatically when the computer is powered on, initializes devices, launches the operating system, and serves as an interface between the operating system and hardware.

An "advanced power management" (APM) specification assigns control of power to the HAL, with limited intervention by the operating system. In an "Advanced Configuration and Power Interface" (ACPI) model, the HAL provides the OS with methods for directly controlling the low-level details of the hardware so it has nearly complete control over the power savings. For example, systems may be put into extremely low-consumption states, from which the system can be awaked by ordinary interrupts (real time clock, keyboard, modem, etc.).

Having the operating system control power settings allows power settings to be readily tailored to the needs of application programs running on the operating system. However, in large multi-server installations in which several different operating systems can be running on a common hardware platform, the role of an information-technology administrator in controlling power is complicated by the fact that each operating system has its own user interface and methods of controlling power. What is needed is a way to allow a consistent user interface across operating systems while retaining the flexibility offered by operating-system control of power settings.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

The present invention provides for coordinating, at the level of the mission operating system level, platform and mission operating-system (MOS) control of power settings. The user can choose either platform-manager or MOS interfaces as the primary interface for controlling power settings, while using the other as a secondary interface when needed.

Figure 1:
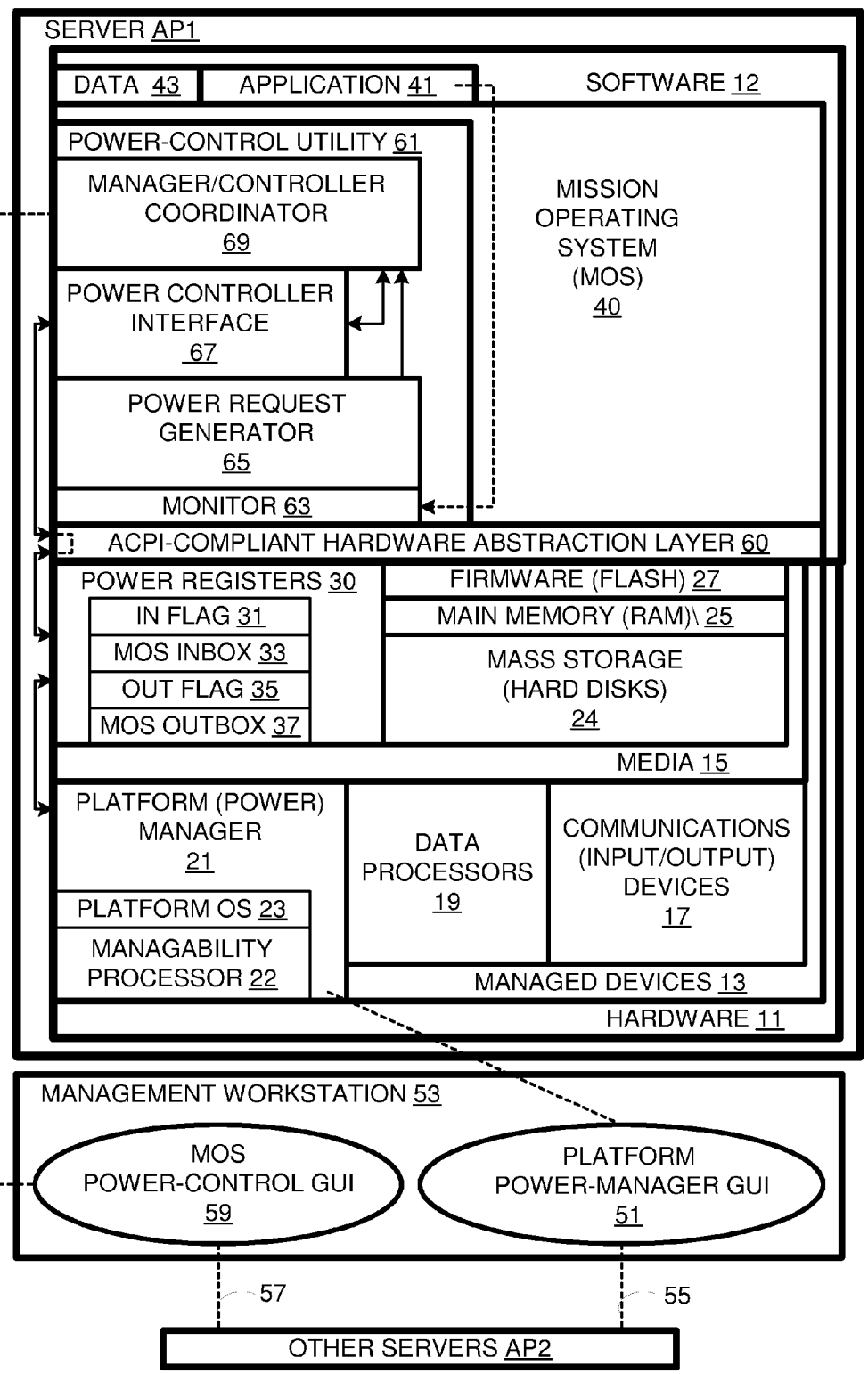
FIG. 1 is a schematic diagram of a computer system in accordance with an embodiment of the invention.

A server AP1 in accordance with an embodiment of the invention is shown in FIG. 1 in its hardware 11 and software 12 aspects. Hardware 11 includes managed devices 13, which can include media 15, communications devices 17 (including I/O devices), data processors 19, and a platform manager 21, which can have its own manageability processor 22 and platform operation system 23. Media 15 can include a variety of media types including mass storage devices 24 such as hard disks, main memory 25 (typically RAM), firmware, e.g., flash memory or read-only memory 27, as well as registers 30 associated with platform manager 21. These registers include an in-flag 31, an MOS-inbox 33, an out-flag 35, and an MOS-outbox 37. Herein, a "flag" is a small, typically, one-bit register, while "boxes" are more capacious multi-bit registers.

Typically, remote or local hard disks store disk images for software. In this case, mass storage 24 stores disk images of MOS 40, application 41, and data 43. All this software can be copied to main memory 25 for faster access when needed. Some boot code is stored in read-only memory (ROM or flash-ROM), from which it can be executed without first being copied to main memory.

Platform manager 21 is an extended version of devices used to manage hardware in a multi-server system. Platform manager 21 can gather data for management and diagnostic purposes. The data can be provided to a user in the form of a power-controller graphical user interface (GUI) 51 available at a management workstation 53; workstation 53 is connected to server AP1 over a dedicated manageability network 55. In practice, a user can also use a local interface through a console connected directly to the server. The interface for the console can be different than the interface at management workstation 53.

Workstation 53 can control power settings for server AP1 and other servers AP2 via dedicated management network 55. This network is separate from a data network 57 that MOS 40 uses to communicate with other operating systems on servers AP2 and management workstation 53. Management workstation 53 is connected to servers AP1 and AP2 through both manageability network 55 and data network 57. Management workstation 53 serves as a remote console for MOS 40 and the operating systems for servers AP2 so that an IT administrator can configure and control servers AP1 and AP2 using operating system interfaces, such as GUI 59 for MOS 40.

An IT administrator can select between GUIs 51 and 59 for controlling power on servers AP1 and AP2. GUI 51 is based on an MOS-independent non-HTTP browser, while GUI 59 is MOS-specific. GUI 51 provides a uniform interface even when dealing with different MOSs; it also works well with manageability tools for tasks other than power control. GUI 59 may provide greater flexibility to meet the needs of application 41.

One user may choose power-manager GUI 59 as the primary interface; the user can still interact with power controller through GUI 51 to, for example, reduce power settings in the event of a platform fan failure. Another user may choose controller GUI 51 as the primary interface, but allow power-manager 41 to reduce power due to a "heating, ventilation, and cooling" (HVAC) failure that issues an alert to a management tool of MOS 40.

From the perspective of manageability network 55, platform manager 21 is a managed node from which data can be gathered and to which power setting adjustment commands can be sent. As implemented, platform manager 21 is a dedicated "manageability" processor with its own specialized software component including platform OS 23 devoted to manageability. This manageability software component operates largely independently of MOS 40. When a platform manager and associated elements are referred to herein as "MOS-independent", this means that operation of the platform manager and its interface do not change depending on what MOS (e.g., HPUX, Windows, OpenVMS, Linux, Non-Stop Kernel) is used for running application programs such as application 41.

MOS 40 includes an ACPI-compliant hardware abstraction layer 60 and power-manager utility 61. Power manager 61 includes a parameter monitor 63, a power-request generator 65, a power controller interface 67, and a manager/controller coordinator 69. Monitor 63 tracks parameters that can affect the desired power settings, such as application performance. Also, monitor 63 can accept requests from application 41 for changes in power settings. The monitored data and application requests are converted to power setting requests by generator 65.

Power-controller interface 65 interfaces with remote management platform manager 21. From the perspective of MOS 40, controller 21 is an ACPI-managed device. This allows power manager 61 to receive power-adjustment requests from controller 21. In addition, power manager 61 controls power settings of ACPI managed devices 13 via ACPI layer 60. In the illustrated embodiment, power manager 61 does not control power consumption of platform manager 21; in alternative embodiments, a power manager does control power consumption by a power controller.

Since platform manager 21 and MOS 40 operate largely independently of each other, some channel of communication must be established for them to cooperate in power management. Certain "power" registers 30 of platform manager 21 are made available to MOS 40 through ACPI layer 60. These registers include single-bits "in" and "out" flags 31 and 35, respectively and multi-bit "inbox" and "outbox" registers, 33 and 37 respectively.

Platform manager 21 writes power-setting instructions to OS inbox 33 and then sets in-flag 31. This triggers an ACPI general-purpose event (GPE), which causes MOS 40 to read the power setting instructions in inbox 33. Once MOS 40 finishes handling the request, it sets out-flag 35 and inserts a description of the current power settings in outbox 37 using a "device-specific (_dsm) method available in ACPI. Platform manager 21 regularly polls out-flag 35. When it is set, platform manager 21 reads outbox 37 to determine the current power settings. Once platform manager 21 has read outbox 37, it resets out-flag 35.

The invention provides for MOS-level control of power settings in addition to the above-describe hardware control. As shown in FIG. 1, power manager 41 determines power settings itself. Also, monitor 63 provides for receiving requests from application 41 for changes in power settings.

Coordinator 69 resolves potential conflicts between requests from platform manager 21 and software requests for changes in power settings. In a platform-priority mode, coordinator 69 gives priority to platform-generated requests, since these are likely to be asserted by an information technology administrator to override automated settings. In a software-priority mode, coordinator 69 gives priority to software requests (e.g., to ensure terms-of-use provisions are met). In a policy mode, settings are determined according to user specified power management policies; by default, priority is given to whichever request is for the lower power setting.

In platform-priority mode, managed devices 13 support four power modes: STATIC HIGH, EFFICIENT, STATIC LOW, and OS CONTROL. "STATIC HIGH" is a fixed high-performance and high-power state. "STATIC LOW" is a fixed low-performance and lower-power state. "EFFICIENT" calls upon the operating system to use whatever algorithm it employs to determine an efficient tradeoff between power and performance. For example, a power level can be selected to maintain at desired utilization level. "OS CONTROL" allows MOS 40 to set power levels according to whatever criteria are applicable; in this mode, power-setting requests by application 41 can be honored. STATIC LOW is implemented so the operating system kernel is unable to exit STATIC LOW mode (platform hardware modifies available Pstates to only expose P-max). STATIC HIGH and EFFICIENT are implemented by application 41. Alternative embodiments use different names for the same states, use additional states, omit some of these states, or use a completely independent set of power-vs-performance states.

Note that this description makes references to states defined in "Advanced Configuration and Power Interface Specification" (ACPI) promulgated by Hewlett-Packard Corporation, Intel Corporation, Microsoft Corporation, Phoenix Technologies Ltd., and Toshiba Corporation, Revision 3.0, Sep. 2, 2004, particularly pages 13-23. The ACPI specification defines global power states G0-G3, device states D0-D3, and processor states C0-C3. In addition, there are "sleeping" states with state G1 and performance level states P0, and P1-Pn within device state D0 and processor state C0. Some embodiments provide for additional states. Not all systems, devices, and processors have all states. The invention also provides for controller power settings for systems, devices, and processors that have various power states not conforming to the ACPI standard.

In the ACPI processor power state C1, the MOS can be asked to deactivate a processor. It does that by removing it from scheduling computational and I/O work and then gives it to firmware for the firmware to put the processor in a lower power state, e.g., a HALT_LIGHT state for an Itanium processor (manufactured by Intel Corporation). For activation, the MOS sends an interrupt to the processor to be activated. This wakes the processor out of HALT_LIGHT but in the control of firmware. The firmware returns the processor back to the operating system. Then the operating system allows computational and I/O work to be scheduled for the newly activated processor. Note, while the foregoing description emphasizes control of processor power states, the present invention provides for control of other managed devices including communications and media (e.g., main memory and mass storage) devices.

Figure 2:
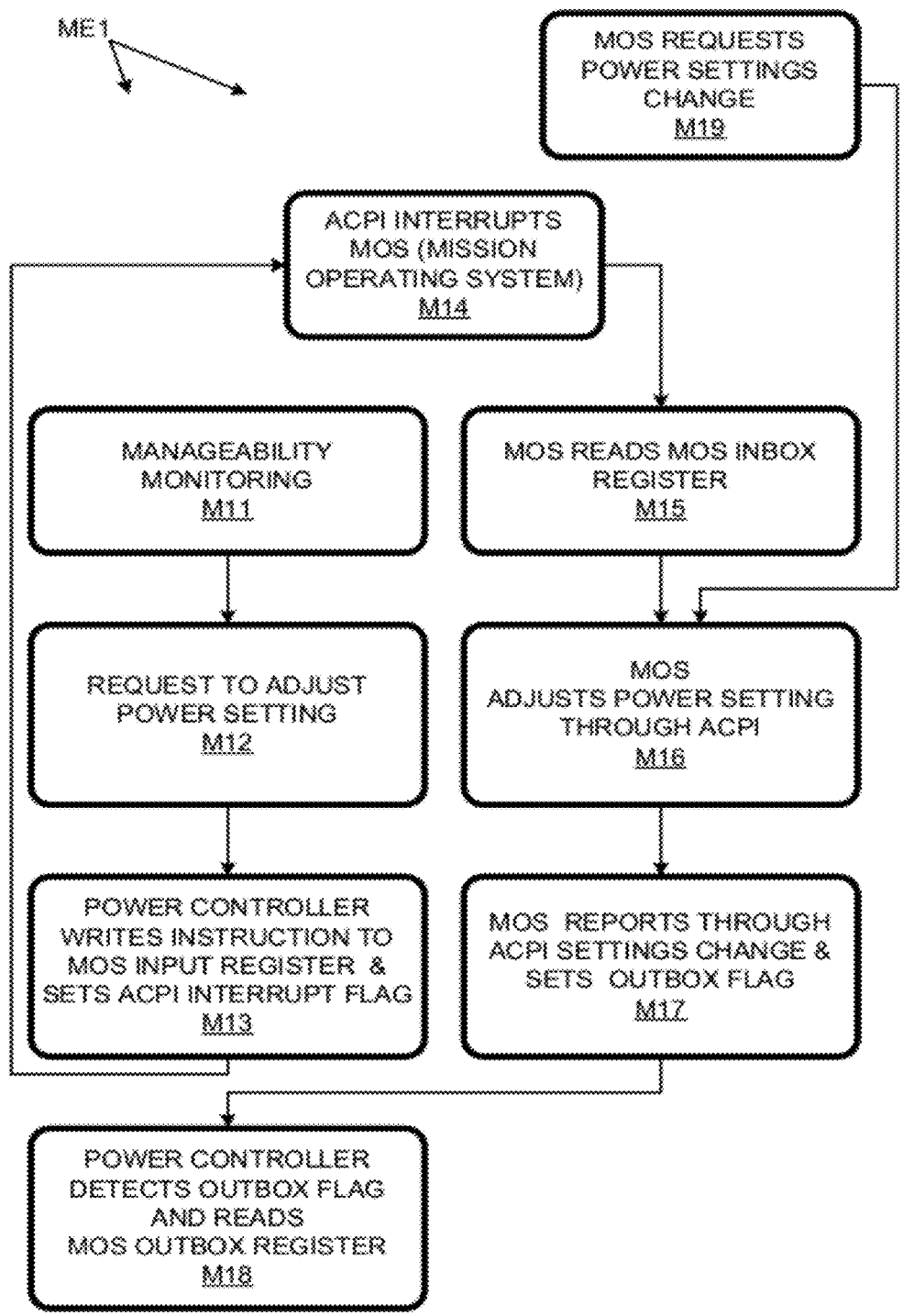
FIG. 2 is a flow chart of a method in accordance with a method embodiment of the invention.

A method ME1 implemented in server AP1 in accordance with an embodiment of the invention is flow-charted in FIG. 2. At method segment M11, platform manager 21 monitors performance-related and power-related parameters, e.g., processor utilization and temperature. This monitoring can be used for local control of power settings. Also, the data resulting from the monitoring is provided to a remote controller for coordination with data from other servers for system-wide power control.

At method segment M12, platform manager 21 generates a request for an adjustment of a power setting. This request may be based on local data, or a request received from a remote workstation managing power over a multi-server system. At method segment M13, platform manager 21 writes the request to OS-inbox register 33 and sets ACPI in-flag 31. It should be noted that this same communication path can be used to set the control submode (STATIC HIGH, STATIC LOW, EFFICIENT, OS CONTROL) for MOS 40.

Upon recognizing that in-flag 31 is set, ACPI layer 60 generates a general-purpose event at method segment M14. At method segment M15, the general-purpose event causes MOS 40 to read OS-inbox register 33, which contains data indicating the requested power settings. At method segment M16, MOS 40 adjusts power settings of managed devices through ACPI layer 60. At method segment M17, MOS 40 then reports that the power settings have been adjusted as requested by setting out-flag 35 using a "device-specific method" (_dsm) to flip the bit in out-flag 35.

Platform manager 21 can then detect that out-flag 35 has been set at method segment M18. Assuming that MOS 40 is in platform-priority mode, the fact that out-flag 35 is set means that the request has been implemented. In addition, the fact that it is set indicates that the MOS is cooperating with platform manager 21 in power management. Power controller can reset out-flag 35 once it is read.

A legacy or otherwise non-compliant MOS will ignore a request from platform manager 21 so that out-flag 35 is never set. In this case, platform manager 21 times out at method segment M18. In such a case, platform manager 21 can report to remote management workstation 53 that the MOS is unresponsive. Future attempts to manage power can focus on other servers or other methods of controlling the power consumed by server SV1 (e.g., through communication directly with application 41 or MOS 40 without going through platform manager 21 or ACPI layer 60), as the power consumed by server SV1 cannot be controlled directly by remote manageability tools.

In OS-CONTROL mode, MOS 40 implements platform requests at method segment M16 if there are no competing software requests. However, if at method segment M19, power-request generator 65 has generated a competing request (e.g., in response to data gathered by monitor 63 or requests received from application 41), MOS 40 may ignore the request of platform manager 21 or treat it simply as a factor in determining power adjustments. When adjustments are made, the adjustments are described in MOS outbox register 37 and out-flag 35 is set at method segment M17. At method segment M18, platform manager 21 detects that out-flag 35 is set and reads MOS-outbox register 37 to determine the actual power settings.

ACPI layer 60 conforms to the ACPI specification, as well as to a processor abstraction layer (PAL) specification, a system abstraction layer (SAL) specification, and an extensible firmware interface (EFI) specification. The present invention provides for these and other evolving standards for hardware-OS interfaces. For example, EFI is evolving into a Uniform Extensible Firmware Interface (UEFI) specification that may usurp the function of ACPI. In that case, the invention provides for using UEFI for communication between a platform power control function and a MOS.

The invention further provides for other channels of communication between a platform power controller and a MOS. For example, in an alternative embodiment, a power controller can access main memory used by the MOS. For another example, the platform manager can communicate with the MOS over a network. In the illustrated embodiment, the platform manager and the MOS communicate with other computers over different networks. In an alternative embodiment, the platform manager uses the same network as the MOS; the platform manager and the MOS communicate power-setting data over this network. These and other variations upon and modifications to the illustrated embodiment are provided for by the present invention, the scope of which is defined by the following claims.

What is claimed is:

1. A computer system comprising:
hardware adapted for executing a mission application and a mission operating system (MOS) instance of a MOS for interfacing said mission application and said hardware, said hardware having power settings including power settings corresponding to a relatively high-power, high-performance state and a non-off relatively low-power, low-performance state;
an Advanced Configuration and Power Interface (ACPI) layer;
a platform manager storing a platform operating system (POS) instance, said platform manager including a platform processor for executing said POS instance so as to provide a non-MOS-specific user interface instance for a user to control said power settings via said MOS instance via said ACPI layer via said POS instance; and
said MOS instance, said MOS having a MOS-specific user interface, said MOS instance, when executed, providing a MOS-specific user interface instance of said MOS-specific user interface so that said user can control said power settings via said MOS-specific user interface instance without using said non-MOS-specific user interface instance.

2. A computer system as recited in claim 1 wherein said MOS instance controls said power settings at least in part as a function of demand or load characteristics of said application program.

3. A computer system as recited in claim 1 wherein said POS instance communicates said power settings to said MOS instance via said ACPI layer.

4. A computer system as recited in claim 3 wherein said MOS instance communicates said power settings to said POS instance via said ACPI layer.

5. A computer system as recited in claim 3 wherein said MOS instance communicates power-settings it has made to said POS instance using a device-specific method as provided for by said ACPI layer.

6. A computer system comprising:
hardware adapted for executing a mission application and a mission operating system (MOS) instance of a MOS for interfacing said mission application and said hardware, said hardware having power settings including power settings corresponding to a relatively high-power, high-performance state and a non-off relatively low-power, low-performance state, -wherein said MOS instance communicates with MOS instances of different MOSs running on other computers via a data network on which said POS instance does not communicate, said POS instance communicating a management workstation via a manageability network on which said management network communicates with other platform operating systems but on which said MOS instance does not communicate;
an Advanced Configuration and Power Interface (ACPI) layer; and
a platform manager storing a platform operating system (POS) instance, said platform manager including a platform processor for executing said POS instance so as to provide a non-MOS-specific user interface instance for a user to control said power settings via said MOS instance via said ACPI layer via said POS instance.

7. A method of controlling power settings on a computer, said method comprising:

using by a user of a mission-operating-system-independent platform operating system user interface of a platform operating system (POS) instance to make a first power-setting selection from plural power settings, said power settings including power settings corresponding to a relatively high-power, high-performance state and a non-off relatively low-power, low-performance state for hardware configured to execute a mission operating system (MOS) instance interfacing a mission application and said hardware;

said POS instance communicating said first power-setting selection via an Advanced Configuration and Power Interface (ACPI) layer to said MOS instance;

said MOS instance implementing said first power-setting selection to yield a new power setting;

said MOS instance communicating said new power setting to said POS instance via said ACPI layer; and said MOS instance or said mission application issuing a software request for a power-setting adjustment, said MOS instance implementing a power-setting adjustment as a function of both said first power-setting selection and said software request.

8. A method as recited in claim 7 further comprising:

a user using said MOS-specific user interface instance of said MOS instance to make a second power setting selection, said user making said second power-setting selection without using said mission-operating-system-independent platform operating system user interface; and said MOS instance implementing said second power setting selection.

9. A method as recited in claim 7 wherein said POS instance communicates said power-setting selection to said MOS instance through said ACPI layer using a general-purpose event.

10. A method as recited in claim 7 wherein said MOS instance communicates with said POS instance using an ACPI device-specific method to set or reset a flag.

11. A method of controlling power settings on a computer, said method comprising:

using by a user of a mission-operating-system-independent platform operating system user interface of a platform operating system (POS) instance to make a first power-setting selection from plural power settings, said power settings including power settings corresponding to a relatively high-power, high-performance state and a non-off relatively low-power, low-performance state for hardware configured to execute a mission operating system (MOS) instance interfacing a mission application and said hardware;

said POS instance communicating said first power-setting selection via an Advanced Configuration and Power Interface (ACPI) layer to said MOS instance;

said MOS instance implementing said first power-setting selection to yield a new power setting;

said MOS instance communicating said new power setting to said POS instance via said ACPI layer; and sending plural power-setting selections to plural servers having instances of different mission operating systems with respective instances of different respective user interfaces, said requests being sent from a management workstation using a platform management network not used by said instances of different mission operating systems.

12. A method as recited in claim 11 wherein said management workstation runs a non-hypertext transfer protocol (non-HTTP) browser that provides said mission-operating-system-independent platform operating system user interface.

* * * * *